United States Patent [19]

Farrell

[11] 4,221,497
[45] Sep. 9, 1980

[54] FITTING FOR MACHINES

[75] Inventor: Michael Farrell, Much Hadham, England

[73] Assignee: Casematers (Herts & Essex) Limited, Hertfordshire, England

[21] Appl. No.: 941,766

[22] Filed: Sep. 13, 1978

Related U.S. Application Data

[63] Continuation-in-part of Ser. No. 834,262, Sep. 19, 1977, abandoned.

[30] Foreign Application Priority Data

Sep. 27, 1976 [GB] United Kingdom ............... 40046/76

[51] Int. Cl.² .............................................. F16D 1/06
[52] U.S. Cl. .................................... 403/344; 403/290; 83/665
[58] Field of Search ................. 403/344, 373, 24, 350, 403/409, 290; 83/665, 659

[56] References Cited

U.S. PATENT DOCUMENTS

| | | | |
|---|---|---|---|
| 709,366 | 9/1902 | Sexton | 403/344 |
| 945,106 | 1/1910 | Moodey | 403/344 |
| 1,446,016 | 2/1923 | Moritz | 83/665 |
| 3,246,555 | 4/1966 | Finlay | 83/665 |
| 3,285,642 | 11/1966 | Sauer | 83/659 X |
| 3,871,777 | 3/1975 | Sauer | 403/344 X |

Primary Examiner—Andrew V. Kundrat
Attorney, Agent, or Firm—Oblon, Fisher, Spivak, McClelland & Maier

[57] ABSTRACT

A boss for mounting on a shaft comprising a discontinuous ring member, with a link bridging the discontinuity, a pivotable lever, and an eccentric drive connection between the lever and the link, whereby pivoting of the lever produces relative movement between the link and at least one side of the discontinuity to alter the size thereof to facilitate clamping and unclamping of the boss on the shaft. In one embodiment a second eccentric drive connection is provided between the said other end of the link and the ring member. The second eccentric drive connection is also adjustable to allow for presetting the tension in the link. In another embodiment the effective length of the link is adjustable to allow for presetting the tension in the link. An overcenter mechanism retains the lever in its locking position.

15 Claims, 9 Drawing Figures

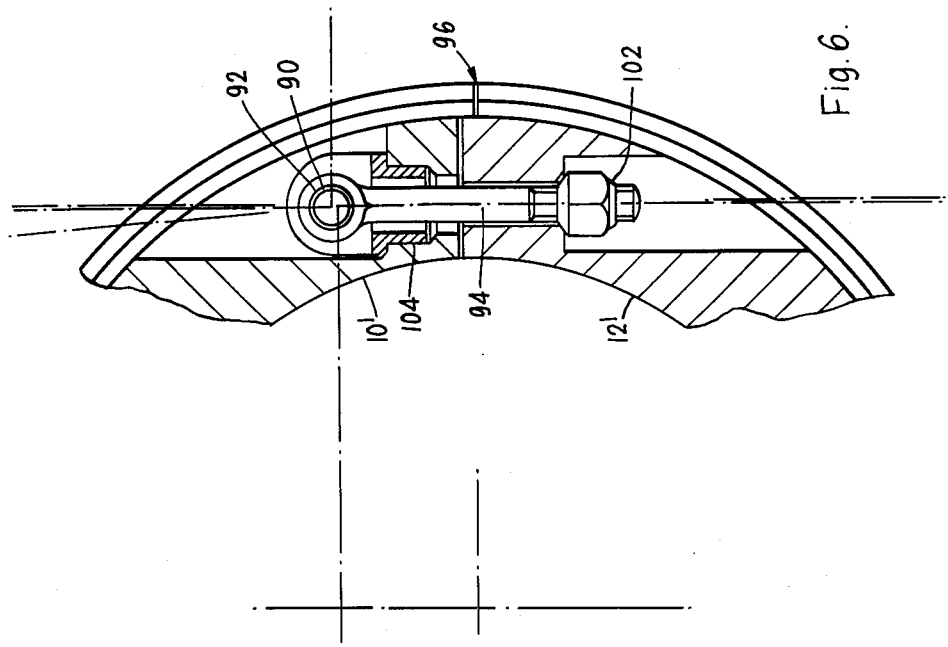
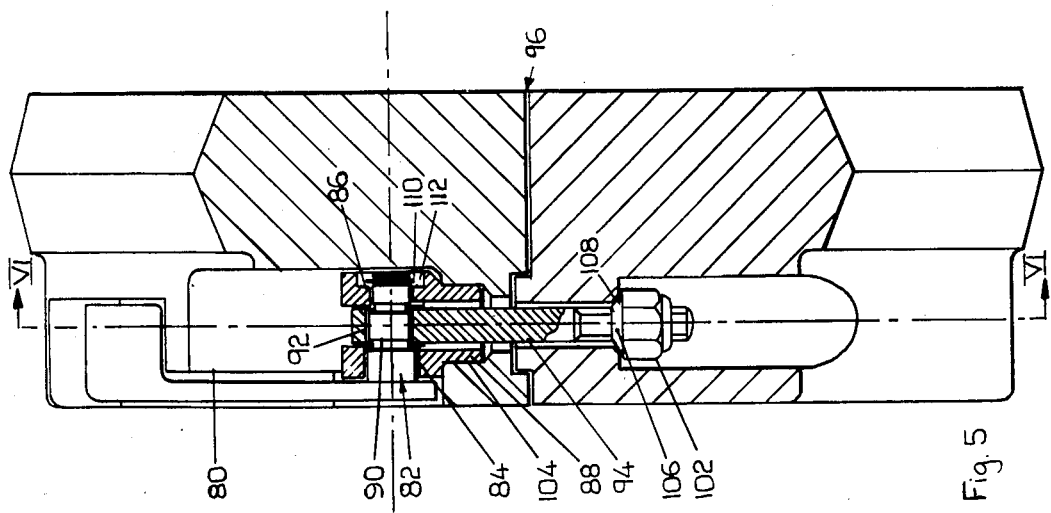

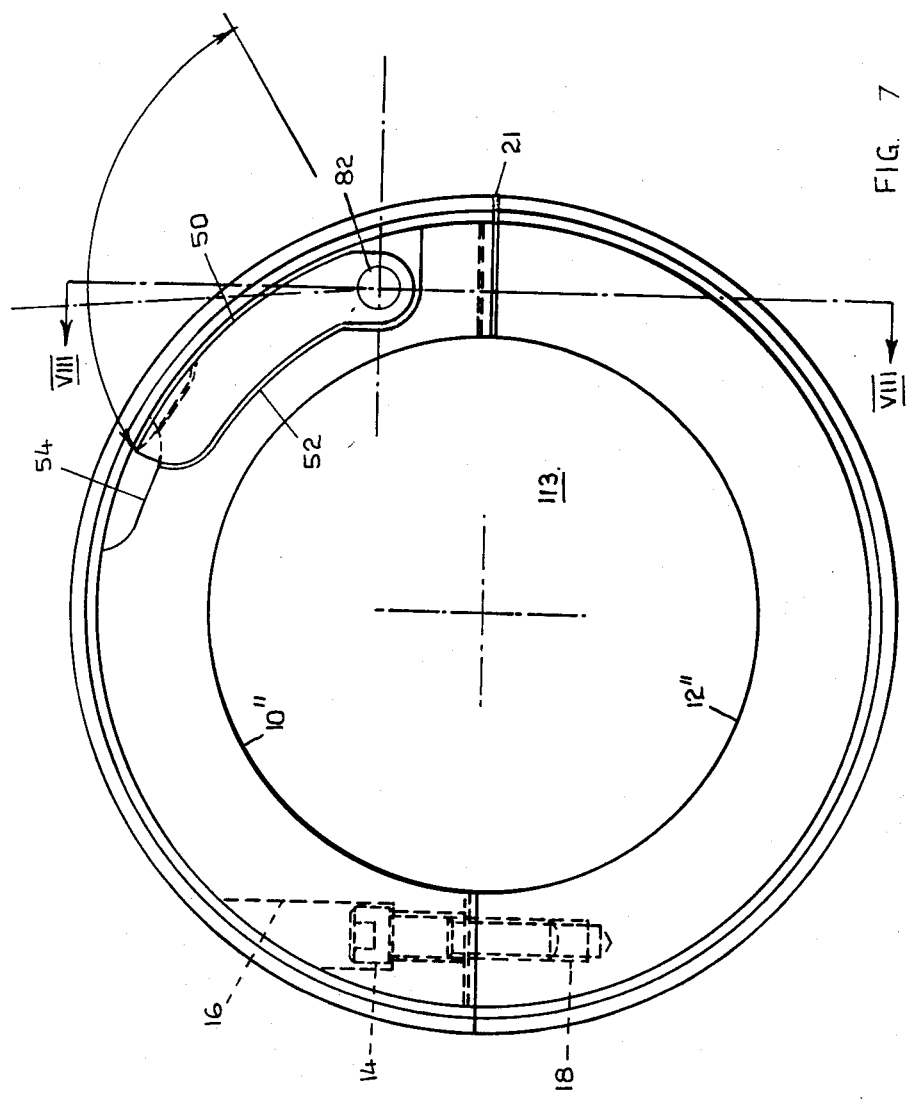

FITTING FOR MACHINES

This application is a continuation in part of my earlier application filed on Sept. 19, 1977 under Ser. No. 834,262 which has been abandoned.

FIELD OF THE INVENTION

This invention concerns fittings for machines and in particular a boss for mounting on a shaft where adjustment of the position of the boss is required in relation to the shaft.

BACKGROUND OF THE INVENTION

There are many situations where the axial and/or rotational position of a boss has to be reset with respect to the shaft or other bosses upon the shaft and it is an object of the invention to provide an improved clamping mechanism for such a boss which will allow the latter to be unclamped and moved laterally and/or rotationally along the shaft to a new position and reclamped in a matter of seconds.

DESCRIPTION OF THE PRIOR ART

U.S. Pat. No. 3,871,777 to Sauer discloses a clamping means for a split rotary anvil consisting of two rings having a discontinuity, rotatable upon the shaft. The clamping means consist of a tongue 30 bridging the discontinuity, fixed to a bore in one ring half and extending to a second bore in the other ring half. The second bore contains an eccentric shaft 90 which is engageable with the cut out portion 38 of the tongue so that rotation of the eccentric shaft results in clamping or unclamping of the discontinuity. The shaft may be rotated by means of sockets 66 or 68, and a locking gear 120 is provided for locking the shaft against rotation. However, Sauer lacks a lever attached to the shaft which may be positioned so that when the lever is in its locking position, the eccentric portion of the shaft is in an over centre position so that the tension in the link acts to retain the lever in its locking position. Sauer also lacks any means for preadjusting the link of the tongue.

It is most important that the eccentric portion is over centre when the lever is in its locking position to provide a self locking effect. If no such over centre provision is ensured the lever would tend to move during the use of the boss thereby unclamping the boss, and making its use impractical.

SUMMARY OF THE INVENTION

A boss for mounting on a shaft and embodying the invention comprises a discontinuous ring member, a link bridging the discontinuity, a pivotable lever carried by the boss and an eccentric drive connection between the lever and the link whereby pivoting of the lever produces relative movement between the link and at least one side of the discontinuity to alter the size thereof to facilitate clamping and unclamping of the boss on the shaft.

The boss may be formed from two arcuate sections one pair of opposed ends of which form the said discontinuity and the other pair of opposed ends of which are joined by a semi-permanent connection.

Alternatively the boss may be formed from a single generally annular member having a region thereof cut away to form the said discontinuity.

Conveniently the link is attached at one end to the said eccentric drive. The other end of the link may be connected to the ring member through a second eccentric drive which is adjustable to allow for pre-setting the tension in the link. Alternatively the effective length of the link may be adjustable to preset the tension in the link.

The locking position of the pivotal lever corresponds to an over centre position of the eccentric throw line of the eccentric drive connection between the lever and ring member so that the tension in the link acts along such a line as to retain the pivotable lever in its locking position.

In addition or alternatively locking means may be provided for retaining the pivotal lever in its locking position.

Depending on the application the internal surface of the ring member which contacts the shaft is either smooth and/or coated with a low friction material such as polytetrafluroethylene, and/or may be grooved or otherwise formed for keying to the shaft, or is lined with friction material such as brake or clutch lining.

The invention is of particular application to the mounting of cutting knives or saws or slotting tools or creasing tools. The tool may be entegral with the boss or may be a separate component mounted thereon.

BRIEF DESCRIPTION OF THE DRAWINGS

The invention will now be described by way of example with reference to the accompanying drawings. In the drawings:

FIG. 5 is an end section on the line V,V in FIG. 4, FIG. 6 is a cross section on the line VI,VI of FIG. 5 of part of the device, FIG. 7 is a plan view of a further embodiment of the invention.

DETAILED DESCRIPTION OF THE PREFERRED EMBODIMENT

Figure 1:
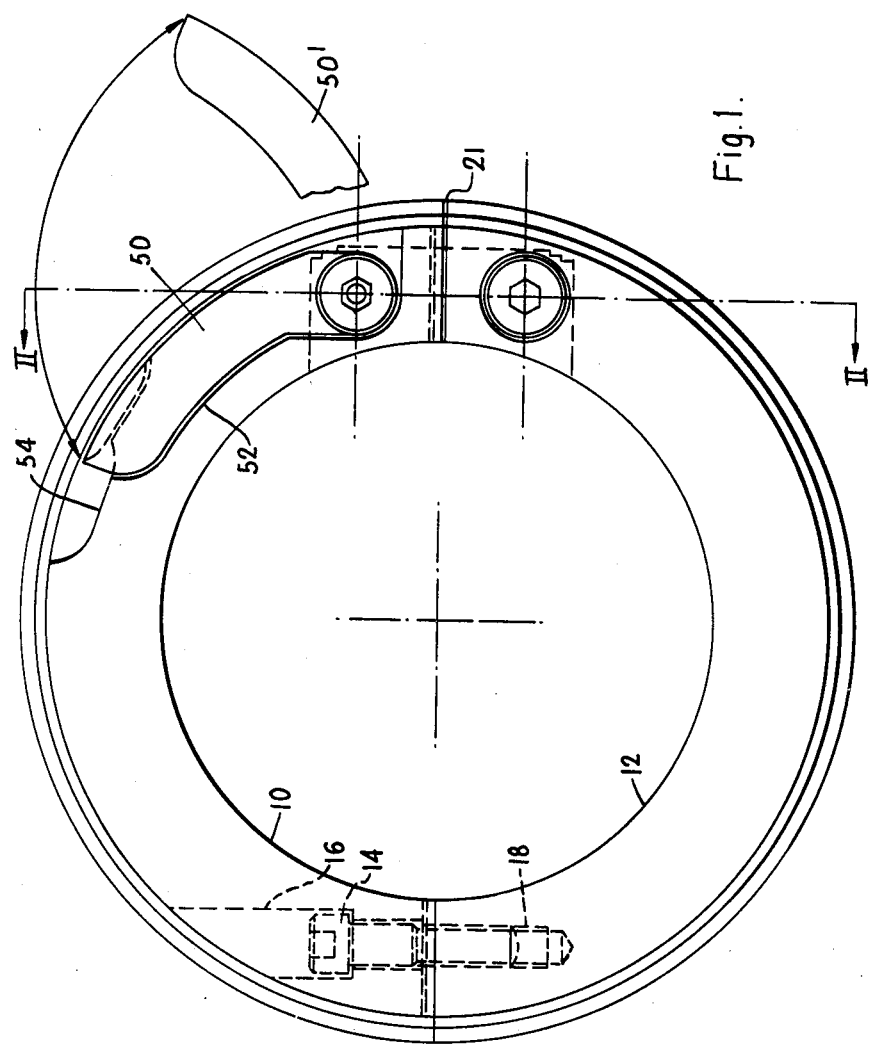
FIG. 1 is a plan view of one embodiment of the invention.
Figure 2:
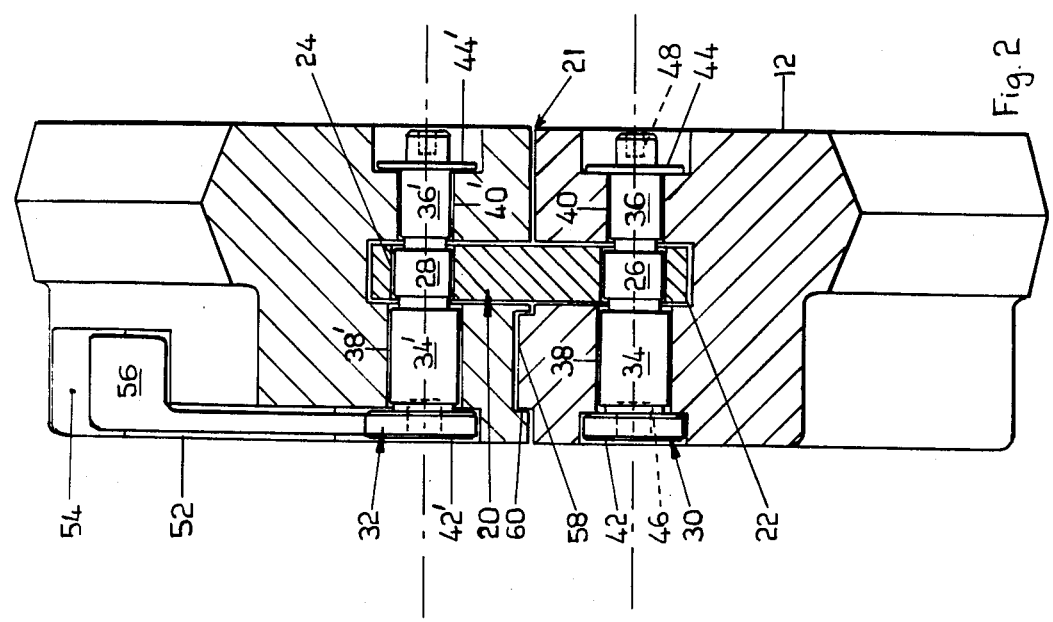
FIG. 2 is an end view of the device shown in FIG. 1, shown in cross section with the line II,II of FIG. 1.

A tool boss adapted to be clamped onto a circular shaft is shown in FIGS. 1 and 2 as being formed from two arcuate halves 10 and 12 which are joined at one end by a bolt 14, the head of which is contained within a counterbore 16. The threaded shank of the bolt is screwed into an axially aligned threaded hole 18 in the opposed ends of boss half 12.

The opposite ends of the two arcuate halves 10 and 12 are joined by a tie link 20 (shown in FIG. 2). This has circular apertures 22, 24 at each end within which are received eccentric portions 26 and 28 respectively of each of two pins 30 and 32.

The pin 30 includes non-eccentric sections 34 and 36 which rotate in aligned bores 38 and 40 within the lower arcuate half 12 and is retained by an enlarged head 42 at one end and at the other end by a seratted washer 44 and screw 48. The pin 30 is rotatable by slackening screw 48, inserting an appropriate tool into socket 46. This rotates the eccentric section 26 about the pin axis which is locked by tightening screw 48, to preset the tension in the link 20 and preset the discontinuity 21.

The pin 32 includes coaxial non-eccentric sections 34' and 36' which rotate within aligned apertures 38' and 40' in the other arcuate half 10. An enlarged head 42' at one end and a plain washer 44' and screw similar to screw 48 retain it in place.

A lever 50 is attached to pin 32 for turning the latter about its axis. A recess 52 in the surface of arcuate half 10 accomodates the lever 50 which is curved so that its outer surface conforms to the outer surface of the arcuate half 10 when the lever fits into the recess 52. An extension recess 54 accomodates a laterally extending flange 56 by which the lever is lifted.

Lifting the lever 50 out of the recess 52 rotates the eccentric section 28 and the relative angular position of the lever 50 and eccentric section 28 is such that clockwise rotation of the lever 50 rotates the eccentric section 28 and urges the tie link 20 out of the arcuate half 10. As seen from FIG. 1, however the extreme rest position of the lever 50 within the recess 52 is designed to be just beyond the maximum withdrawal position of the eccentric section 28 when acting on the tie link 20 so that the eccentric section 28 has been rotated over centre when the lever 50 is pushed completely into the recess 52. In this way the tension acting in the link 20 when the lever 50 is fully in the recess 52 urges the lever 50 into the recess 52 and restrains it from leaving the recess.

A safety catch may be provided for retaining the lever 50 in the recess particularly if the boss is to be rotated at high speed.

The radii of the internal circular profiles of the arcuate halves 10 and 12 and the distance between their centres of curvature (which may not be co-incident) and the distance between their opposing end surfaces adjacent to tie link 20 (when mounted upon the shaft and clamped together by bolt 14 at the one end only) are chosen so that, with no tension in tie link 20, the boss is a sliding fit upon the shaft. When tie link 20 is tensioned, the two arcuate halves are strained to conform to the surface of the shaft over a sufficient area and with sufficient pressure to ensure the required resistance to movement of the boss relative to the shaft.

Since the hole 22 is a close slipping fit on the eccentric section 26, rotation of the pin 30 will move link 20 into or out of the arcuate half 12. The mechanism is arranged so that with pin 30 set to cause tie link 20 to be partially withdrawn into the arcuate half 12, rotation of lever 50 into recess 52 tensions link 20 sufficiently to clamp the boss upon the shaft. Clamping pressure is adjusted by turning the pin 30 which is locked in the selected position by screw 48. The boss may be moved by lifting lever 50 to release the clamping pressure and sliding the boss along the shaft.

Axial registration of the two arcuate halves is maintained at all times by a key 58 and cooperating slot 60 formed in the opposed end surfaces of the two arcuate halves 10 and 12. A similar key and slot shown in dotted outline are formed in the opposed end faces which are normally clamped together by means of the bolt 14.

The action of the device may be improved by arranging it such that at least one of the surfaces which are clamped by bolt 14 is slightly inclined so that the effective size of the central hole of the boss is enlarged to increase the clearance between the boss and the shaft when opened. The eccentric sections 26,28 could be cams and apertures 22 and 24 form cam followers or a cam (which of course need not be a cylindrical section) mounted for rotation about the axis of the shaft on which it is carried rather than about an accentric axis.

Figure 3:
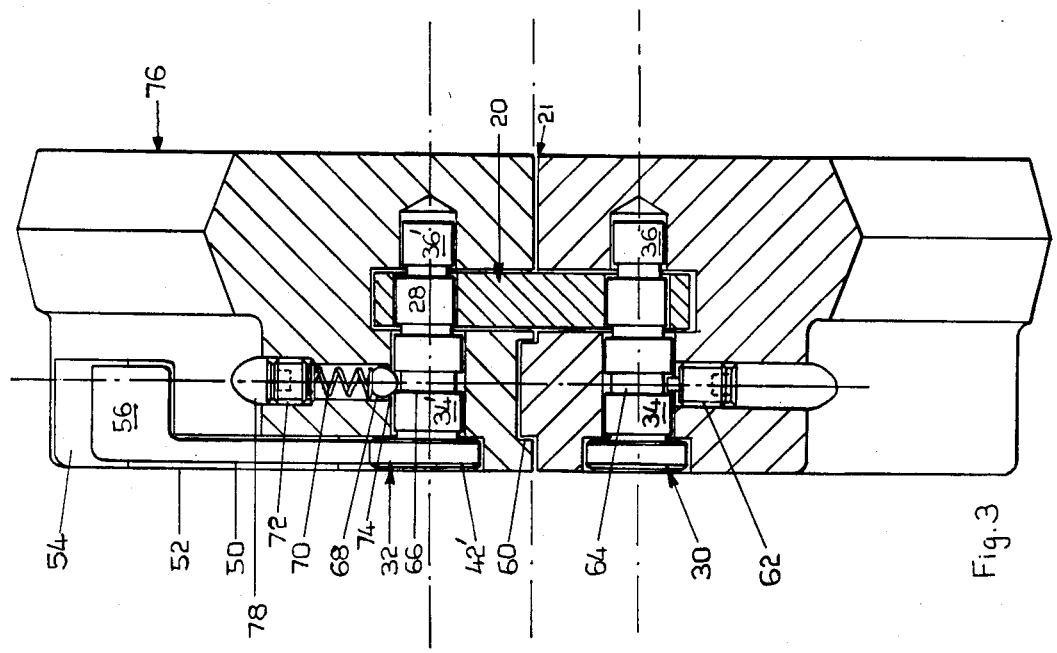
FIG. 3 is an end view also sectioned on the line II,II of the device shown in FIG. 1 but modified to incorporate alternative means for retaining operating parts within the boss.

FIG. 3 illustrates a variation of the embodiment shown in FIGS. 1 and 2. The setting pin 30 is retained by a grub screw 62 the end of which locates in an annular groove 64 formed in pin section 34. Since the pin 30 is now retained by the grub screw 62, there is no need for the washer 44 and screw 48.

Tightening the grub screw 62 locks the setting pin 30.

The pin 32 is also formed with an annular groove 66 in the pin section 34' and a ball 68 is forced into the groove 66 by a helical spring 70 retained by a grub screw 72. The spring loaded ball 68 axially locates the pin 32 but the pin 32 can be withdrawn by pulling so as to deflect the ball 68 against the spring to allow the section 36 to pass.

A lip 74 is formed around the lower end of the passage containing the ball 68 to prevent the ball from falling out of the passage. Since the pin 32 is retained by the ball 68, the washer 44' and retaining screw required in the FIG. 2 embodiment can be dispensed with.

The arrangement of FIG. 3 has two advantages: the face 76 of the boss is free for the mounting of tools and demounting of the boss from the shaft is further facilitated since the fitter only has to pull out the pin 32 to release the link.

Where the last advantage is not important, the ball 68 and spring 70 can be dispensed with and the pin 32 can be retained by adapting the passage 78 with a screw thread over the whole of its length to allow the grub screw 72 to be screwed down to engage in the annular groove 66.

Figure 4:
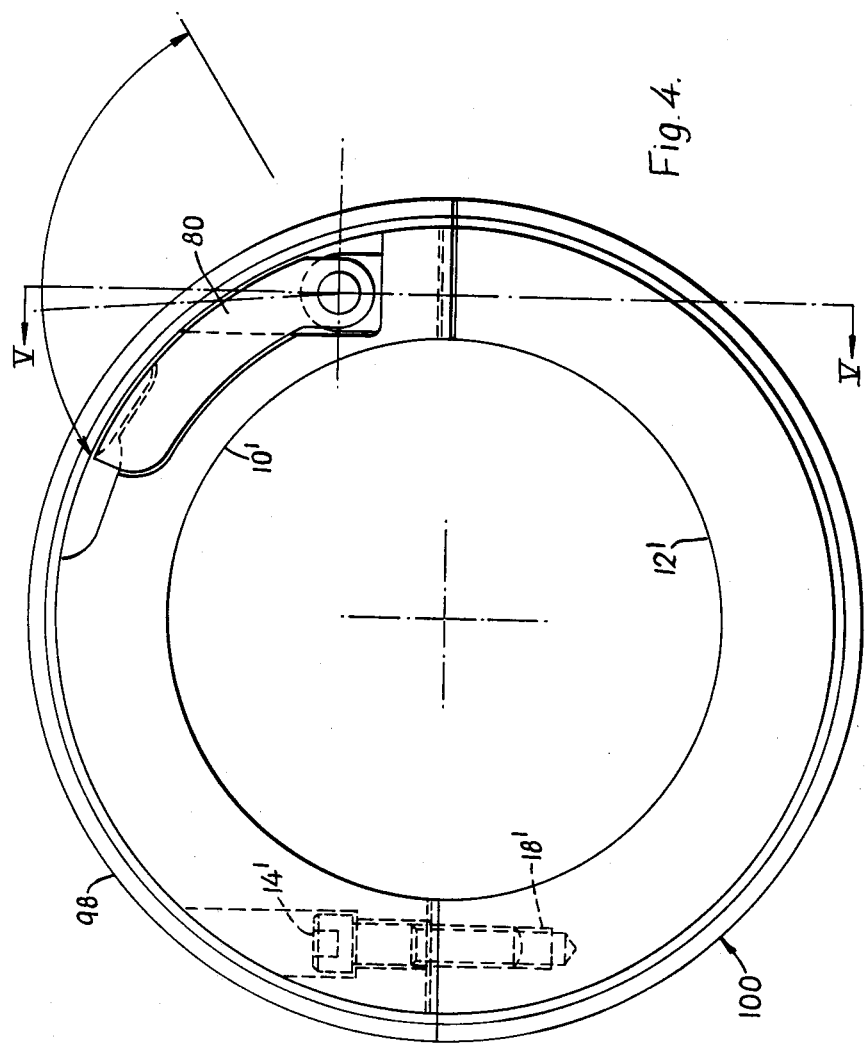
FIG. 4 is a plan view of another embodiment of the invention.

A further alternative embodiment is shown in FIGS. 4, 5 and 6 of the drawings. The principle of operation of this further embodiment is similar to that of the embodiment shown in FIGS. 1 and 2 in that a lever 80 is attached to or formed integrally with a pin 82 which is rotatable in axially aligned holes 84 and 86 in the bifurcated end of a collar 88 and which includes an eccentric section 90 which engages in an aperture 92 in one end of a tie link 94. The collar 88 is retained on one side of the discontinuity 96 between the two arcuate sections 98 and 100. The other end of the tie link 94 is retained in position by a self-locking nut 102.

With the lever 80 in the closed position, clamping pressure is adjusted by turning the nut 102. Lifting the lever 80 releases the tension in link 94 and therefore the clamping pressure between the boss and the shaft as in the previous embodiments.

The chief difference between the embodiment shown in FIGS. 4 to 6 and that shown in FIGS. 1 and 2 is that the holes 84 and 86 within which the pin 82 is located are not formed in the boss itself but in the collar 88 which is separate from the boss. The tie link is similar to an eye bolt.

As the lever 80 is turned and the pin 82 is rotated so the angular position of the link 94 will vary due to the eccentric motion of the section 90 of the pin 82. To this end the self-locking nut 102 is formed with a part spherical seating 106 which allows the link 94 to pivot relative to the seating 108 against which the nut 102 is located.

The pin 82 is retained in the holes 84 and 86 by means of a CIRCLIP (Registered Trade Mark) 110. As shown the section of the collar containing the hole 86 is partly cut away at 112 to accommodate the CIRCLIP.

Figure 9:
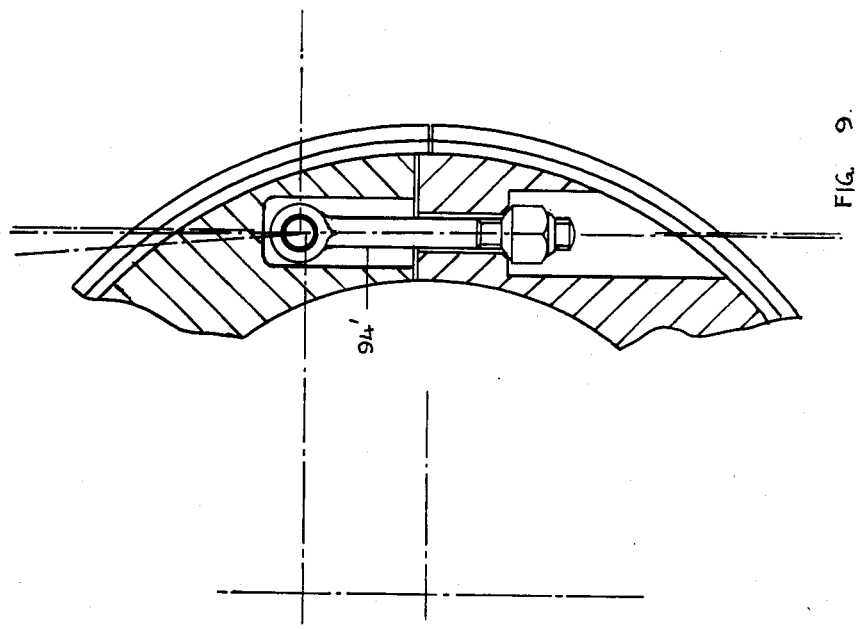
FIG. 9 is a cross section on the line IX,IX of FIG. 8 of part of the device.
Figure 8:
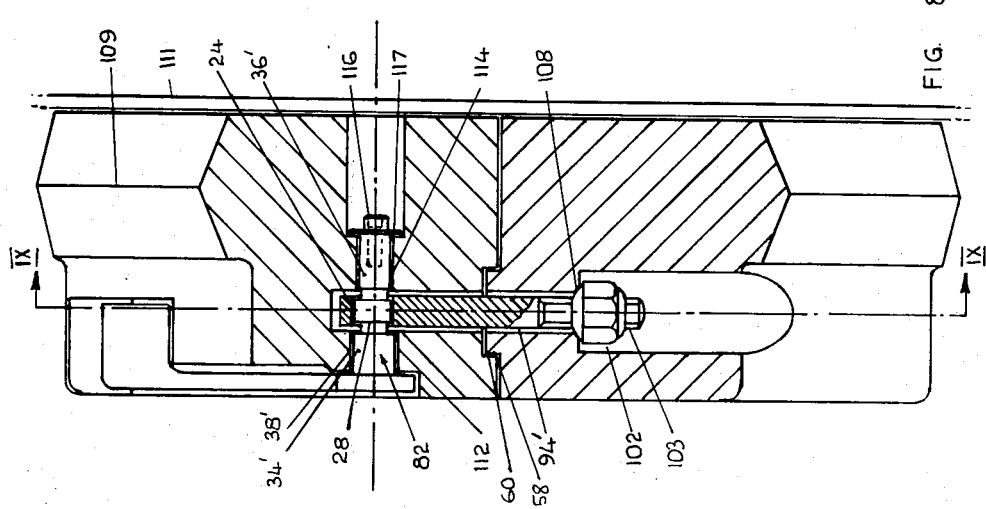
FIG. 8 is an end view of the device of FIG. 7 in cross section on the line VIII,VIII in FIG. 7

FIGS. 7 to 9 illustrate a further embodiment similar to that shown in FIGS. 4 to 6 in which the eccentric drive pin 82 is received in aligned bores in 112, 114 in the half 10" and is held by socket screw 116 and washer 117.

The lower end of the link 94' is formed with a screw thread on which is threaded a nut 102 similar to that shown in FIGS. 5 and 6. Screwing up the nut 102 increases the tension in the link.

The FIGS. 7–9 embodiment obviates the need for the split collar assembly 88.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A boss for mounting on a shaft comprising in combination:
    a discontinuous ring member;
    a tool operatively associated with the ring;
    a link bridging the discontinuity;
    a pivotable lever carried by the boss and movable through an over centre position into a rest position; and
    an eccentric drive connection between the lever and the link, the eccentric drive connection being attached to one end of said link and including non-eccentric portions with one opposed end on one side of the discontinuity including axially aligned bores with which the non-eccentric portions are rotatably received;
    whereby pivoting of the lever into and out of the rest position produces relative movement between the link and at least one side of the discontinuity to alter the size thereof to facilitate clamping and unclamping of the boss on the shaft.

2. A boss for mounting on a shaft comprising in combination:
    a discontinuous ring member;
    a link bridging the discontinuity;
    a pivotable lever carried by the boss;
    an eccentric drive connection between the lever and the link, the eccentric drive connection being attached to one end of said link; and
    a second eccentric drive connection between the other end of the link and the ring member and means for adjusting the second eccentric drive connection to allow for presetting the tension in the link.

3. A boss for mounting on a shaft comprising in combination:
    a discontinuous ring member;
    a link bridging the discontinuity;
    a pivotable lever carried by the boss;
    an eccentric drive connection between the lever and the link, the eccentric drive connection being attached to one end of the said link, and including noneccentric portions; and,
    at one opposed end of one side of the discontinuity, a seating, a collar within the seating, the collar having a bifurcated outer end and said bifurcated end having formed therein two axially aligned bores within which the noneccentric portions of said eccentric drive connection are rotatably received;
    whereby pivoting of the lever produces relative movement between the link and at least one side of the discontinuity to alter the size thereof to facilitate clamping and unclamping of the boss on the shaft.

4. A boss for mounting on a shaft comprising in combination:
    a discontinuous ring member coated with a low friction material;
    a link bridging the discontinuity;
    a pivotable lever carried by the boss and movable through an over centre position into a rest position; and,
    an eccentric drive connection between the lever and the link;
    whereby pivoting of the lever into and out of the rest position produces a relative movement between the link and at least one side of the discontinuity to alter the size thereof to facilitate clamping and unclamping of the boss on the shaft.

5. A boss as set forth in claim 3 wherein the said other end of the link is formed with a screw thread and the said other opposed end on the other side of the discontinuity includes a seating, an internally threaded member adapted to abut thereagainst and the link is screwed into the said internally threaded member.

6. A boss as set forth in claim 5 wherein the seating is concave and the said internally threaded member includes a part spherical surface which cooperates with the concave seating to allow the said internally threaded member to tilt.

7. A boss for mounting on a shaft comprising in combination:
    a discontinuous ring member;
    a link bridging the discontinuity;
    a pivotable lever carried by the boss; and
    an eccentric drive connection being attached to one end of said link and including non-eccentric portions;
    axially aligned bores formed in the ring member on one side of the discontinuity with which the said non-eccentric portions are received.
    a screw thread formed at the other end of the link;
    an internally screw threaded member engaged on the threaded end of the link and
    a seating within the ring member, on the said other side of the discontinuity which seating surrounds the threaded end of the link, the internally threaded member being adapted to abut against the said seating, as the internally threaded member is screwed onto the threaded end of the link, to permit the latter to be pretensioned.

8. A boss as set forth in claim 7 when mounted on a shaft.

9. A boss as set forth in claim 8 further comprising a tool integrally formed with the boss.

10. A boss as set forth in claim 8 further comprising a tool removably screwed thereto.

11. A boss for mounting on a shaft comprising in combination:
    a discontinuous ring member;
    a link bridging the discontinuity;
    an eccentric drive attached to one end of the said link and including non-eccentric portions;
    a pivotable lever, attached to the eccentric drive for rotating same, and
    at one opposed end of one side of the discontinuity, a seating and a collar within the seating, the collar having formed therein two axially aligned bores within which the non-eccentric portions of said eccentric drive are rotatably received; whereby pivoting of the lever produces relative movement between the link and at least one side of the discontinuity to alter the size thereof to facilitate clamping and unclamping of the boss on the shaft.

12. A boss for mounting on a shaft comprising in combination:
a discontinuous ring member;
a link bridging the discontinuity;
first actuator means carried by the boss;
an eccentric drive connection between the first actuator means and the link, the eccentric drive connection being attached to one end of said link whereby pivoting of the first actuator means produces relative movement between the link and at least one side of the discontinuity, to alter the width thereof to facilitate clamping and unclamping of the boss on the shaft, and
second actuator means for adjusting the tension in the link to allow the tension to be preset.

13. A boss as set forth in claim 18 further comprising in combination:
a second eccentric drive connection between the said other end of the link and the ring member, wherein the said second actuator means acts on the said second eccentric drive connection for adjusting the second eccentric drive connection to allow for presetting the tension in the link.

14. A boss for mounting on a shaft as set forth in claim 12 further comprising in combination:
a seating within the ring member;
a screw thread formed at the said other end of the link, the screw-threaded end thereof protruding through said seating; and
an internally screw-threaded member engaged on the threaded end of the link and adjustable therealong to abut against said seating as the internally threaded member is screwed onto the thread against the link to permit the tension in the latter to be preset, said internally screw-threaded member constituting said second actuator means.

15. A boss for mounting on a shaft as set forth in claim 12 wherein:
the discontinuous ring member is formed with two similar segments which together make up the complete ring, the complete ring thereby having two discontinuities, and further comprising:
a second link bridging the second discontinuity and means for tensioning the second link to adjust the tension therein and therefore the tension in the first mentioned link, said means for adjusting the tension in the second link comprising said second actuator means.

* * * * *